United States Patent
Kamimura et al.

[15] 3,689,819
[45] Sept. 5, 1972

[54] MECHANISM FOR SIMULTANEOUS X-Y POSITIONING ON TWO OPPOSING VERTICALLY DISPOSED WORK SURFACES

[72] Inventors: Masato Kamimura; Risaburo Arai; Saburo Fukui, all of Tokyo, Japan

[73] Assignee: Nippon Electric Company, Limited, Minato-ku, Tokyo, Japan

[22] Filed: Nov. 30, 1970

[21] Appl. No.: 93,572

[30] Foreign Application Priority Data

Dec. 1, 1969  Japan ...................... 44/96718

[52] U.S. Cl. .................................... 318/575, 74/16
[51] Int. Cl. ............................................ G05b 19/32
[58] Field of Search...... 318/575, 576, 577, 578, 625; 187/3; 74/16

[56] References Cited

UNITED STATES PATENTS

| | | |
|---|---|---|
| 2,943,905 | 7/1960 | Godet .................... 318/575 X |
| 799,993 | 9/1905 | Levalley .................. 183/3 UX |
| 2,719,254 | 9/1955 | Clemence et al. ...... 318/625 X |
| 2,628,539 | 2/1953 | Neergaard ............. 318/575 X |
| 3,486,092 | 12/1969 | Macko ....................... 318/575 |

*Primary Examiner*—Benjamin Dobeck
*Attorney*—Sandoe, Hopgood & Calimafde

[57] ABSTRACT

Apparatus for simultaneously positioning two implements, e.g., wire wrapping guns for a wiring application, with respect to two physically reversed work pieces, e.g., electrical connection boards, along an orthogonal coordinate (e.g. X–Y) axis system employs two worktables which vertically (Y-axis) translate in opposite directions upon a frame. A locator arm end is adapted to vertically move with each worktable, and to selective translate horizontally (X-axis) thereacross.

A first carriage linearly moves in one direction responsive to rotation of a Y-axis motor to vertically move the worktables in inverse directions to define a Y-axis coordinate. A second carriage moves in an orthogonal direction responsive to rotation of an X-axis motor to laterally position each location arm, therefore defining the X-axis coordinate.

5 Claims, 1 Drawing Figure

PATENTED SEP 5 1972
3,689,819
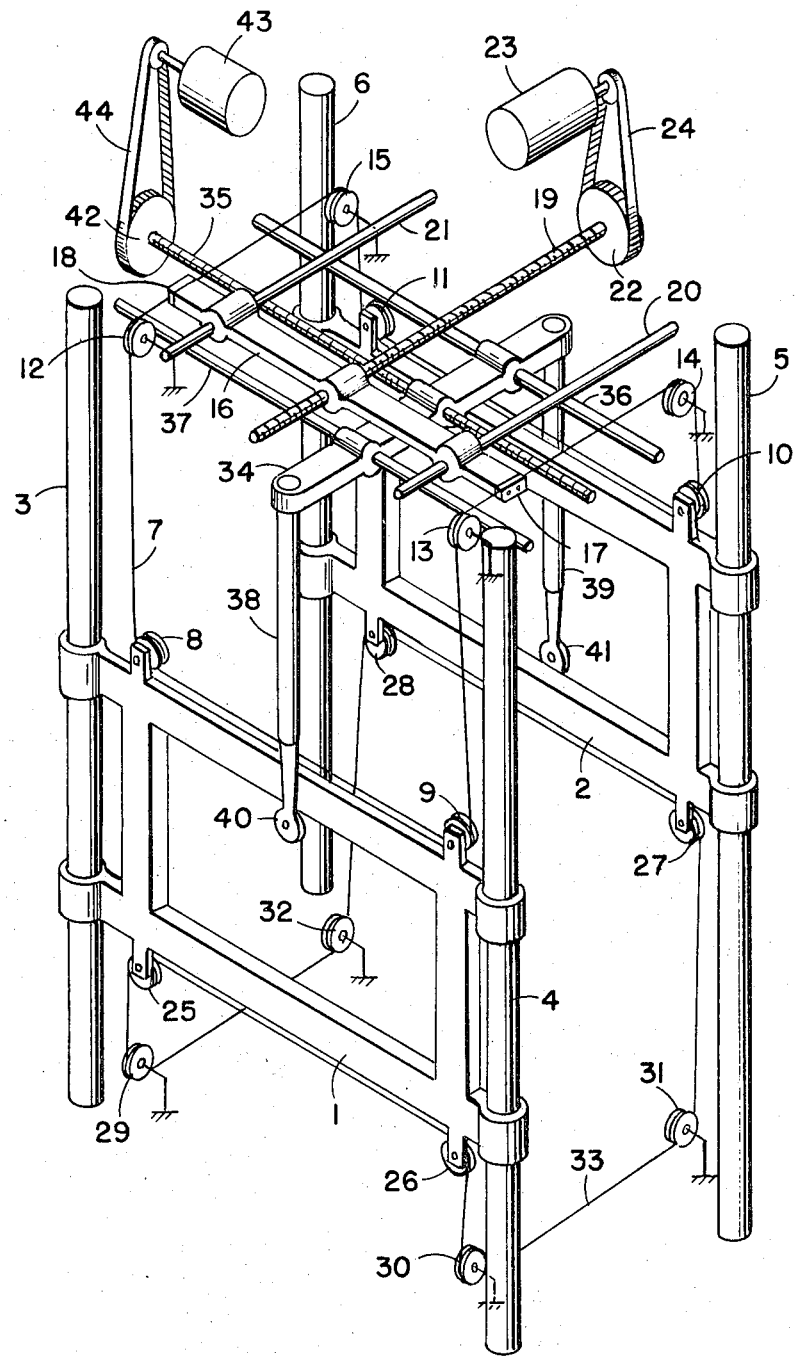
INVENTORS
MASATO KAMIMURA
RISABURO ARAI
SABURO FUKUI
by Sandoe, Hopgood & Calimafde
ATTORNEYS

MECHANISM FOR SIMULTANEOUS X-Y POSITIONING ON TWO OPPOSING VERTICALLY DISPOSED WORK SURFACES

This invention relates to positioning systems and more particularly to a new and improved numerically or computer controlled X-Y positioning mechanism adapted for incorporation into semi-automatic wire termination systems.

A variety of X-Y positioning mechanisms for semi-automatic wiring machines have been proposed.

Most of these prior X-Y positioning mechanisms have drawbacks in failing to meet one or more of the following desirable properties, viz., simplicity of its physical mechanisms, compactness, small floor space requirement, low manufacturing, operation, and maintenance costs, operator comfort, elimination of operator fatigue, and the like.

It is therefore a principal object of the present invention to provide a simple, compact, and economical X-Y positioning mechanism which overcomes, or at least greatly reduces, constructional drawbacks and/or operational difficulties of prior designs.

Although the present X-Y positioning mechanism has been primarily developed for incorporation into semi-automatic wire termination machines utilizing numerically controlled positioning for wiring connection boards, it will be readily obvious to one skilled in the art that the mechanism can also be applied to other kinds of numerically or computer controlled machines.

Outstanding features and advantages for the present X-Y positioning apparatus, as illustratively employed in a wire termination machine, may be briefly summarized as follows:

i. Simultaneous positioning may be effected on two vertically disposed work surfaces by a simple mechanism. In other words, programmed X and Y movements progress simultaneously on two identical connection board surfaces to produce the same point-to-point wiring route, provided that the connection boards be mounted in reverse vis-a-vis lack other.

ii. Two vertically disposed worktables on which there connection boards are to be mounted are so suspended as to counter-balance each other. Load variation of a Y-axis drive motor is therefore greatly reduced compared with other designs.

iii. Counter-balanced worktables simultaneously move up and down (conceptual Y-axis) in small increments as programmed, while a pair of X-axis locator heads to move only the horizontal X axis in small increments as programmed. The worktables and locator heads can maintain the most desirable working level (for instance, near eye level) of two operators seated in front of the upright worktables all the time. This assures easy and smooth capabilities for supplying wires to the locator heads, quick and efficient operation, less operator fatigue or eyestrain, operator comfort due to their upright seated position, and the like. These basic advantages of the X-Y positioning mechanism according to the present invention also exist when the apparatus thereof is applied to other kinds of machines. The above-mentioned and other objects, features, and advantages of the present invention will become apparent by reference to the following detailed description, taken in conjunction with the accompanying drawing.

The drawing is a perspective view of the essential part of a numerically controlled wire termination system in which an X-Y positioning mechanism according to this invention has been incorporated.

Referring to the drawing, connection boards with multiple terminal positions to be wired are respectively mounted on worktables 1 and 2, and are oriented in reverse to each other. The worktables 1 and 2 are slidably mounted on cylindrical guide posts 3, 4, 5, and 6 and are suspended by a wire 7 to counter-balance each other. The wire 7 comprises a loop strung over the pulleys 8, 9, 10, and 11 installed on the upper edges of the worktables and other pulleys 12, 13, 14, and 15 installed on a frame member (not shown). The looped wire cable 7 is clamped at two points to the opposite ends 17 and 18 of a Y-axis carriage 16. The Y-axis carriage 16 is meshed with a Y-axis feed screw 19 at the central portion thereof and slidably mounted on guide rods 20 and 21 near both ends thereof for smooth displacement in the axial direction of the feed screw 19. At the rear end of the feed screw 19, a timing pulley 22 is installed and rotary motion of the Y-axis drive motor 23 is transmitted to the feed screw 19 via a timing belt 24, to thereby permit the carriage 16 to move horizontally. The amount of horizontal displacement of the carriage 16 therefore effects an equal amount of vertical displacement for the worktables 1 and 2. In order to secure smooth displacement of worktables 1 and 2 due to the displacement of the Y-axis carriage 16, it is essential that they be uniformly suspended with respect to their centers of gravity. This mode of suspension is easily accomplished by the looped wire cable 7 symmetrically clamped to the carriage 16 and strung over the pulleys 8, 9, 10, and 11 installed on the top edges of the worktables 1 and 2. As is evident, counter-balancing for worktables 1 and 2 helps reduce load variation of the drive motor 23. As illustrated, another looped wire 33 is also strung over pulleys 25, 26, 27, 28, 29, 30, 31, and 32 in much the same way as the looped wire 7. This helps enable high driving speeds of worktables 1 and 2, and at the same time, eliminate the possibility of vibrations of the worktables due to their inertia.

The mechanism for positioning in the X direction includes an X-axis carriage 34 meshed with an X-axis feed screw 35 and slidably mounted on guide rods 36 and 37, and a pair of X-axis locator arms 38 and 39 rigidly coupled to opposite ends of the carriage 34. An end of each of the X-axis locator arms 38 and 39 constitutes a locator head 40 or 41 for insertion or attachment of a working tool for wiring, such as a portable wrapping gun. At one end of the X-axis feed screw 35, there is provided a timing pulley 42 rigidly coupled thereto in the same manner as the Y-axis feed screw 19, whereby rotary motion of X-axis drive motor 43 is transmitted to the X-axis feed screw 35 via a timing belt 44. Thus movement of the X-axis carriage 34 is converted to movement of the pair of locator heads 40 and 41 in the X direction.

As has been previously mentioned, the Y-direction positioning is essentially performed by an up and down movement of the worktables 1 and 2 on which workpieces are mounted, and the X-direction positioning is essentially performed by a horizontal movement of the locator heads 40 and 41.

If the worktable 1 moves downward, the worktable 2 moves upward by the same distance and vice versa. If the locator head 40 moves in the right direction as seen from the operator seated in front of the worktable 1, the locator head 41 moves in the left direction as seen from the operator seated in front of the worktable 2 and vice versa. Therefore, corresponding terminals which represent the same numbered terminals on the two connection boards can be simultaneously wired by the wrapping guns installed on the locators 40 and 41, the two connection boards being mounted on the worktables reversed to one another as above discussed. In other words, point to point positioning on exactly the same numbered terminals can be programmed on the two connection boards, provided the connection board mounted on worktable 1 and that mounted on worktable 2 be in the "upside-down" relations to each other.

The invention has been described in connection with the particular embodiment as applied to a wire termination system but, as has been mentioned, it is not limited, in many of its aspect, to such an embodiment. The mechanism that has been fully described and illustrated is subject to modification and variation in any suitable manner according to the intended object, i.e., the intended application therefor.

Furthermore, a multi-unit X-Y positioning mechanism for incorporation into a plurality of machines, such as wire termination machines arranged side by side, and driven by a common numerical control or computer unit using only one pair of X- and Y-axis drive motors could be constructed as required.

What is claimed is:

1. A positioning system for effecting simultaneous X-Y positioning on the surfaces of two workpieces mounted on two worktables, the two workpieces being mounted on said worktables reversed from one another, said system comprising,
    two worktables,
    X-axis and Y-axis drive motors,
    means for converting rotary motion of said Y-axis drive motor into a first linear movement,
    means for vertically suspending said worktables opposite one another and for moving said worktables in reverse directions from one another responsive to said first linear movement,
    means for converting rotary motion of said X-axis drive motor into second linear movement, and
    X-axis locator arms, and
    means for moving said X-axis locator arms in the X-axis direction responsive to said second linear movement. counterbalancing 2. A system as in claim 1 wherein said worktable suspending and positioning means includes vertically oriented frame means, means included on said worktables for engaging said frame means and for translating therealong, and means for counterbalancing said worktables.

3. A system as in claim 2 wherein said counterbalancing means comprises means for mounting said worktables in a manner symetrical with respect to their centers of gravity.

4. A system as in claim 1 further comprising first carriage means linearly moved in a first direction responsive to rotary motion of said Y-axis motor, said worktables moving in said Y-axis direction responsive to movement of said first carriage means.

5. A system as in claim 4 further comprising second carriage means linearly moved in a second direction responsive to rotary motion of said X-axis motor, said X-axis locator arm moving in the X-axis direction responsive to motion of said second carriage means.

* * * * *

UNITED STATES PATENT OFFICE
CERTIFICATE OF CORRECTION

Patent No. 3,689,819            Dated September 5, 1972

Inventor(s) Masato Kamimura; Risaburo Arai & Saburo Fukui

It is certified that error appears in the above-identified patent and that said Letters Patent are hereby corrected as shown below:

Claim 1, Column 4, line 15, after "movement." the word --counterbalancing-- should be deleted.

Signed and sealed this 23rd day of January 1973.

(SEAL)
Attest:

EDWARD M. FLETCHER, JR.
Attesting Officer

ROBERT GOTTSCHALK
Commissioner of Patents